US012789292B2

(12) United States Patent
Manjon Fernandez et al.

(10) Patent No.: US 12,789,292 B2
(45) Date of Patent: Nov. 10, 2026

(54) METHOD FOR THE MANUFACTURE OF A WELDED JOINT BY LASER ARC HYBRID WELDING

(71) Applicant: VERDICIO SOLUTIONS A.I.E., Madrid (ES)

(72) Inventors: Alvaro Manjon Fernandez, Oviedo Asturias (ES); Sivasambu Bohm, Godmanchester (GB); Marcos Perez Rodriguez, Cangas del Narcea Asturias (ES)

(73) Assignee: VERDICIO SOLUTIONS A.I.E., Madrid (ES)

( * ) Notice: Subject to any disclaimer, the term of this patent is extended or adjusted under 35 U.S.C. 154(b) by 675 days.

(21) Appl. No.: 18/031,388

(22) PCT Filed: Oct. 21, 2020

(86) PCT No.: PCT/IB2020/059874

§ 371 (c)(1),
(2) Date: Apr. 12, 2023

(87) PCT Pub. No.: WO2022/084718

PCT Pub. Date: Apr. 28, 2022

(65) Prior Publication Data

US 2023/0390868 A1 Dec. 7, 2023

(51) Int. Cl.
*B23K 26/322* (2014.01)
*B23K 26/00* (2014.01)
(Continued)

(52) U.S. Cl.
CPC ........ *B23K 26/322* (2013.01); *B23K 26/0006* (2013.01); *B23K 26/348* (2015.10); *B23K 35/3608* (2013.01)

(58) Field of Classification Search
CPC ........ B23K 35/02; B23K 35/26; B23K 35/36; B23K 35/365; B23K 35/3608; B23K 26/348; B23K 26/322; B23K 26/0006
See application file for complete search history.

(56) References Cited

U.S. PATENT DOCUMENTS 3,588,432 A 6/1971 Arnoldy et al.
3,627,574 A 12/1971 DeLong et al.
(Continued)

FOREIGN PATENT DOCUMENTS

BE 754889 A 1/1971
CA 2535145 A1 12/2006
(Continued)

OTHER PUBLICATIONS

Balos, et al. "Metal Oxide Nanoparticle-Based Coating as a Catalyzer for A-TIG welding: Critical Raw Material Perspective," MDPI, Metals, May 15, 2019 (Year: 2019).*
(Continued)

*Primary Examiner* — Nathaniel E Wiehe
*Assistant Examiner* — Joshua R Beebe
(74) *Attorney, Agent, or Firm* — Davidson Kappel LLC

(57) ABSTRACT

A method for the manufacture of a welded joint having the following successive steps: I. the provision of at least two metallic substrates wherein at least one metallic substrate is a steel substrate having a thickness of at least 8 mm and being delimited by at least one beveled edge, wherein said beveled edge is at least partially coated with a pre-coating having a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof, and II. the welding of the at least two metallic substrates along the at least partially coated beveled edge by laser arc hybrid welding in leading arc configuration.

19 Claims, 1 Drawing Sheet

(51) Int. Cl.

| | |
|---|---|
| ***B23K 26/348*** | (2014.01) |
| ***B23K 35/36*** | (2006.01) |

(56) References Cited

U.S. PATENT DOCUMENTS

| | | | | |
|---|---|---|---|---|
| 4,314,136 A | 2/1982 | Kotecki et al. | | |
| 4,723,060 A | 2/1988 | Arnoldy et al. | | |
| 6,339,209 B1 * | 1/2002 | Kotecki | B23K 35/368 | 219/146.1 |
| 6,664,508 B1 * | 12/2003 | Johnson | B23K 35/362 | 219/136 |
| 2004/0009300 A1 * | 1/2004 | Shimakura | C23C 22/34 | 427/407.1 |
| 2006/0219685 A1 | 10/2006 | Karogal et al. | | |
| 2013/0299460 A1 | 11/2013 | Wu et al. | | |
| 2014/0124482 A1 | 5/2014 | Katiyar et al. | | |

FOREIGN PATENT DOCUMENTS

| | | | | |
|---|---|---|---|---|
| EP | 1537940 A1 | 6/2005 | | |
| EP | 1698428 A1 | 9/2006 | | |
| EP | 1710042 A1 | 10/2006 | | |
| EP | 1710043 A1 | 10/2006 | | |
| GB | 1 336182 A | 11/1973 | | |
| JP | 2006289494 A | 10/2006 | | |
| WO | WO0016940 | 3/2000 | | |
| WO | WO 0059674 A1 | 10/2000 | | |
| WO | WO 2009/086193 A2 | 7/2009 | | |
| WO | WO 2020/212735 A1 | 10/2020 | | |
| WO | WO-2020212885 A1 * | 10/2020 | | C09D 5/08 |
| WO | WO 2022/084716 A1 | 4/2022 | | |
| WO | WO 2022/084717 A1 | 4/2022 | | |
| WO | WO 2022/084718 A1 | 4/2022 | | |
| WO | WO 2022/084719 A1 | 4/2022 | | |
| WO | WO 2022084720 A1 | 4/2022 | | |

OTHER PUBLICATIONS

Zhu, et al., "U-shaped Flux strip constraining Arc Ultra-narrow Gap Welding Device and Welding Method," CPO, CN 102151955 A, Aug. 17, 2011 (Year: 2011).*

Nakamura, et al., "Narrow Groove Weld Joint Using Laser Arc Hybrid Weld Method and Manufacturing Method for the Same," JPO JP 2017154156A, Sep. 7, 2017 (Year: 2017).*

Fu, et al., "Welding method for extra heavy steel plates," JPO, JP 4952892B2, Jun. 13, 2012 (Year: 2012).*

WO 2022/084716 A1/PCT/IB2020/059871, Apr. 28, 2022, In English, filed on Apr. 12, 2023 as U.S. Appl. No. 18/031,518.

WO 2022084720 A1/PCT/IB2020/059876, Apr. 28, 2022, In English, filed on Apr. 12, 2023 as U.S. Appl. No. 18/031,492.

WO 2022/084719 A1/PCT/IB2020/059875, Apr. 28, 2022, In English, filed on Apr. 12, 2023 as U.S. Appl. No. 18/031,426.

WO 2022/084718 A1/PCT/IB2020/059874, Apr. 28, 2022, In English, filed on Apr. 12, 2023 as U.S. Appl. No. 18/031,388.

WO 2022/084717 A1/PCT/IB2020/059872, Apr. 28, 2022, In English, filed on Apr. 11, 2023 as U.S. Appl. No. 18/031,264.

Search Report of PCT/IB2020/059876 of Nov. 12, 2020 and International Report on Patentability.

Search Report of PCT/IB2020/059872 of Jun. 22, 2021 and International Report on Patentability.

Search Report of PCT/IB2020/059874 of Aug. 7, 2021 and International Report on Patentability.

Search Report of PCT/IB2020/059875 of Jun. 22, 2021 and International Report on Patentability.

Search Report of PCT/IB2020/059871 of Jun. 7, 2021 and International Report on Patentability.

Balos Sebastian et al., "Metal Oxide Nanoparticle-Based Coating as a Catalyzer for A-TIG Welding: Critical Raw Material Perspective", METALS, (May 15, 2019), vol. 9, No. 5, doi:10.3390/met9050567, p. 567.

* cited by examiner

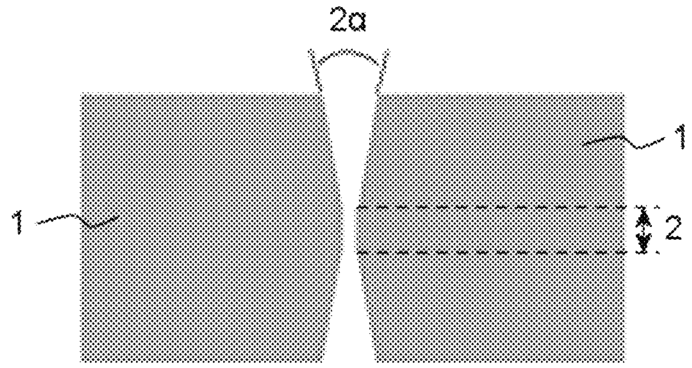
2a
1
1
2

METHOD FOR THE MANUFACTURE OF A WELDED JOINT BY LASER ARC HYBRID WELDING

The present invention relates to the welding of metallic substrates by laser arc hybrid welding, in particular in the case where at least one of the metallic substrates is a steel substrate locally coated with a welding flux to improve the quality of the weld. It also relates to the corresponding steel substrate and to the method for the manufacture of the steel substrate. It is particularly well suited for construction, shipbuilding, transportation industry (rail and automotive), energy-related structures, oil&gas and offshore industries.

BACKGROUND

It is known to weld steel substrates by laser arc hybrid welding. This welding technique combines the principles of laser beam welding and arc welding. There are four main types of laser arc hybrid welding process, depending on the setup used: Tungsten Inert Gas (TIG) also known as Gas Tungsten Arc (GTA), Gas Metal Arc (GMA), sometimes referred to by its subtypes Metal Inert Gas (MIG) or Metal Active Gas (MAG), Plasma Arc and Submerged Arc (SA).

SUMMARY OF THE INVENTION

The combination of the laser process and the arc process results in an increase in both weld penetration depth and welding speed (as compared to each process alone). Nevertheless, despite these improvements, there is still room for limiting the crack occurrence in the welds and improving the process stability and consequently the weld penetration.

There is thus a need for improving the quality of the weld made by laser arc hybrid welding and therefore the mechanical properties of welded steel substrates. There is also a need for increasing the deposition rate and productivity of the laser arc hybrid welding.

To this end, the invention relates to a method for the manufacture of a welded joint comprising the following successive steps:

I. The provision of at least two metallic substrates wherein at least one metallic substrate is a steel substrate having a thickness of at least 8 mm and being delimited by at least one beveled edge, wherein said beveled edge is at least partially coated with a pre-coating comprising a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof, and II. The welding of the at least two metallic substrates along the at least partially coated beveled edge by laser arc hybrid welding in leading arc configuration.

The method according to the invention may also have the optional features listed below, considered individually or in combination:

the titanate is chosen from among: $Na_2Ti_3O_7$, $NaTiO_3$, $K_2TiO_3$, $K_2Ti_2O_5$, $MgTiO_3$, $SrTiO_3$, $BaTiO_3$, $CaTiO_3$, $FeTiO_3$ and $ZnTiO_4$ and mixtures thereof, the thickness of the pre-coating is between 10 to 140 μm, the percentage of the nanoparticulate oxide in the pre-coating is below or equal to 80 wt. %, the percentage of the nanoparticulate oxide in the pre-coating is above or equal to 10 wt. %, the nanoparticles have a size comprised between 5 and 60 nm, the percentage of titanate in the pre-coating is above or equal to 45 wt. %, the diameter of the titanate is between 1 and 40 μm, the pre-coating further comprises a binder, the percentage of binder in the pre-coating is between 1 and 20 wt. %, the arc of the laser arc hybrid welding is selected among submerged arc, gas metal arc, gas tungsten arc and plasma arc.

the precoating further comprises microparticulate compounds selected among microparticulate oxides and/or microparticulate fluorides, the precoating further comprises microparticulate compounds selected from the list consisting of $CeO_2$, $Na_2O$, $Na_2O_2$, $NaBiO_3$, NaF, $CaF_2$, cryolite ($Na_3AlF_6$) and mixtures thereof.

The invention also relates to a method for the manufacture of a pre-coated steel substrate comprising the successive following steps:

A. The provision of a steel substrate having a thickness of at least 8 mm and being delimited by at least one beveled edge with a bevel angle comprised between 1 and 10°, B. The deposition, at least partially on said beveled edge, of a pre-coating solution comprising a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof.

The method for the manufacture of a pre-coated steel substrate according to the invention may also have the optional features listed below, considered individually or in combination:

the deposition of the pre-coating solution is performed by spin coating, spray coating, dip coating or brush coating, in step B), the pre-coating solution further comprises a solvent, in step B), the pre-coating solution comprises from 1 to 200 g/L of nanoparticulate oxide, in step B), the pre-coating solution comprises from 100 to 500 g/L of titanate, in step B), the pre-coating solution further comprises a binder precursor, The method further comprises a drying step of the pre-coated steel substrate obtained in step B).

The invention also relates to a steel substrate having a thickness of at least 8 mm and being delimited by at least one beveled edge with a bevel angle comprised between 1 and 10°, wherein said beveled edge is at least partially coated with a pre-coating comprising a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof.

The following terms are defined:

Nanoparticles are particles between 1 and 100 nanometers (nm) in size.

Titanate refers to inorganic compounds containing titanium, oxygen and at least one additional element, such as an alkali metal element, alkaline-earth element, transition metal element or metallic element. They can be in the form of their salts.

"coated" means that the steel substrate is at least locally covered with the pre-coating. The covering can be for example limited to the area where the steel substrate will be welded. "coated" inclusively includes "directly on" (no intermediate materials, elements or space disposed therebetween) and "indirectly on" (intermediate materials, elements or space disposed therebetween). For example, coating the steel substrate can include applying the pre-coating directly on the substrate with no intermediate materials/elements therebetween, as well as applying the pre-coating indirectly on the substrate with one or more intermediate materials/elements therebetween (such as an anticorrosion coating).

Without willing to be bound by any theory, it is believed that the pre-coating mainly modifies the melt pool physics during welding. It seems that, in the present invention, not only the nature of the compounds, but also the size of the oxide particles being equal to or below 100 nm modifies the arc and melt pool physics.

Indeed, the arc, which is going first, melts and incorporates the pre-coating in the molten metal in the form of dissolved species and in the arc in the form of ionized species. Thanks to the presence of titanate and nanoparticles in the arc, the arc is constricted and the temperature of the molten metal pool increases. Consequently, the keyhole, i.e. a literal hole in the steel substrate caused by its vaporization, is formed more easily by the laser impacting the molten metal pool. This improves the process efficiency.

Moreover, the pre-coating dissolved in the molten metal modifies the Marangoni flow, which is the mass transfer at the liquid-gas interface due to the surface tension gradient. In particular, the components of the pre-coating modify the gradient of surface tension along the interface. This modification of surface tension results in an inversion of the fluid flow towards the center of the weld pool. Without willing to be bound by any theory, it is believed that the nanoparticles dissolve at lower temperature than microparticles and therefore more oxygen is dissolved in the melt pool, which activates the reverse Marangoni flow. The latter contributes to the retention of a proper keyhole shape, which, in turn, prevents gas entrapment and thus pores in the weld.

Moreover, the titanate mixed with the nanoparticulate oxide modifies the plasma plume interaction with the laser beam. In particular, the increase in oxygen due to the dissolution of the pre-coating reduces the scattering of the laser beam. Consequently, the laser spot diameter is reduced while the keyhole effect is enhanced. This allows the energy beam to penetrate even more deeply and to be delivered very efficiently into the join. This increases the weld penetration and minimizes the heat affected zone, which in turn limits part distortion.

Moreover, as the components of the pre-coating make the surface tension increase with temperature, the wettability of the weld material increases along the bevel which is colder than the center of the melt pool, which prevents slag entrapment.

Additionally, it has been observed that the nanoparticles improve the homogeneity of the applied pre-coating by filling the gaps between the microparticles and covering the surface of the microparticles. It helps stabilizing the welding arc, thus improving the weld penetration and quality.

BRIEF DESCRIPTION OF THE DRAWINGS

The invention will be better understood by reading the following description, which is provided purely for purposes of explanation and is in no way intended to be restrictive with reference to FIG. 1, which illustrates a substrate with a beveled edge in double Y.

DETAILED DESCRIPTION

The pre-coating comprises a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof. In other words, the pre-coating comprises a titanate and at least one nanoparticulate oxide, wherein the at least one nanoparticulate oxide is selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof. This means that the pre-coating doesn't comprise any other nanoparticulate oxide than the ones listed.

The titanate is selected from the group of titanates consisting of alkali metal titanates, alkaline-earth titanates, transition metal titanates, metal titanates and mixtures thereof. The titanate is more preferably chosen from among: $Na_2Ti_3O_7$, $NaTiO_3$, $K_2TiO_3$, $K_2Ti_2O_5$, $MgTiO_3$, $SrTiO_3$, $BaTiO_3$, $CaTiO_3$, $FeTiO_3$ and $ZnTiO_4$ and mixtures thereof. It is believed that these titanates further increase the penetration depth based on the effect of the reverse Marangoni flow. It is the inventors understanding that all titanates behave, in some measure, similarly and increase the penetration depth. All titanates are thus part of the invention. The person skilled in the art will know which one has to be selected depending on the specific case. To do so, he will take into account how easily the titanates melt and dissolve, how much they increase the dissolved oxygen content, how the additional element of the titanate affects the melt pool physics and the microstructure of the final weld. For example, $NaTiO_7$ is favored due to the presence of Na that improves the slag formation and detachment.

Preferably, the titanate has a diameter between 1 and 40 μm, more preferably between 1 and 20 μm and advantageously between 1 and 10 μm. It is believed that this titanate diameter further improves the arc constriction and the reverse Marangoni effect. Moreover, having small micrometric titanate particles increases the specific surface area available for the mix with the nanoparticulate oxides and have the latter further adhere to the titanate particles. It also makes the particles easier to spray.

Preferably, the percentage in weight of the titanate in dry weight of pre-coating is above or equal to 45%, more preferably between 45% and 90% and even more preferably between 45% and 75%.

The nanoparticulate oxide is chosen from $TiO_2$, $SiO_2$, $ZrO_2$, $Y_2O_3$, $Al_2O_3$, $MoO_3$, $CrO_3$, $CeO_2$, $La_2O_3$ and mixtures thereof. These nanoparticles dissolve easily in the melt pool, provide oxygen to the melt pool and, consequently, increase the penetration depth and stabilize the keyhole which prevent defects. Contrary to other oxides, such as CaO, MgO, $B_2O_3$, $Co_3O_4$ or $Cr_2O_3$, they do not tend to form brittle phases, they do not have a high refractory effect that would prevent the heat from correctly melting the steel and their metal ions do not tend to recombine with oxygen in the melt pool.

Preferably, the nanoparticles are $SiO_2$ and/or $TiO_2$, and more preferably a mixture of $SiO_2$ and $TiO_2$. It is believed that $SiO_2$ mainly increases the penetration depth and eases the slag removal while $TiO_2$ mainly increases the penetration depth and forms Ti-based inclusions which improve the mechanical properties.

Other examples of mixtures of nanoparticulate oxides are:

Yttria-stabilized zirconia (YSZ) which is a ceramic in which the cubic crystal structure of zirconium dioxide ($ZrO_2$) is made stable at room temperature by an addition of yttrium oxide ($Y_2O_3$), A 1:1:1 combination of $La_2O_3$, $ZrO_2$ and $Y_2O_3$, which helps adjusting the refractory effect and promote the formation of inclusions.

Preferably, the nanoparticles have a size comprised between 5 and 60 nm. it is believed that this nanoparticles diameter further improves the homogeneous distribution of the coating.

Preferably, the percentage in weight of the nanoparticulate oxide in dry weight of pre-coating is below or equal to 80%, preferably above or equal to 10%, more preferably between 10 and 60%, even more preferably between 20 and 55%. In some cases, the percentage of nanoparticles may have to be limited to avoid a too high refractory effect. The person skilled in the art who knows the refractory effect of each kind of nanoparticles will adapt the percentage case by case.

According to one variant of the invention, once the pre-coating is applied on the steel substrate and dried, it consists of a titanate and a nanoparticulate oxide.

According to another variant of the invention, the pre-coating further comprises at least one binder embedding the titanate and the nanoparticulate oxide and improving the adhesion of the pre-coating on the steel substrate. This improved adhesion further prevents the particles of the pre-coating from being blown away by the flow of the shielding gas when such a gas is used. Preferably, the binder is purely inorganic, notably to avoid fumes that an organic binder could possibly generate during welding. Examples of inorganic binders are sol-gels of organofunctional silanes or siloxanes. Examples of organofunctional silanes are silanes functionalized with groups notably of the families of amines, diamines, alkyls, amino-alkyls, aryls, epoxys, methacryls, fluoroalkyls, alkoxys, vinyls, mercaptos and aryls. Amino-alkyl silanes are particularly preferred as they are greatly promoting the adhesion and have a long shelf life. Preferably, the binder is added in an amount of 1 to 20 wt % of the dried pre-coating.

According to another variant of the invention, the pre-coating further comprises microparticulate compounds, such as microparticulate oxides and/or microparticulate fluorides, such as, for example, $CeO_2$, $Na_2O$, $Na_2O_2$, $NaBiO_3$, NaF, $CaF_2$, cryolite ($Na_3AlF_6$). Moving from nanoparticles to microparticles for some of the nanoparticulate oxides listed above alleviate the health and safety concerns related to the use of some of these oxides. $Na_2O$, $Na_2O_2$, $NaBiO_3$, NaF, $CaF_2$, cryolite can be added to improve the slag formation so that slag entrapment is further prevented. They also help forming an easily detachable slag. The pre-coating can comprise from 0.1 to 5 wt %, in dry weight of pre-coating, of $Na_2O$, $Na_2O_2$, $NaBiO_3$, NaF, $CaF_2$, cryolite or mixtures thereof.

Preferably the thickness of the pre-coating is between 10 to 140 μm, more preferably between 30 to 100 μm.

The pre-coating covers at least partially one beveled edge of a steel substrate. The latter can have any shape compatible with the laser arc hybrid welding. For the purpose of the invention, it is simply defined by a thickness of at least 8 mm, so that it is compatible with laser arc hybrid welding, and by a beveled edge to be at least partially welded to another metallic substrate. The bevel can have the shape of a single Y or a double Y, depending on the thickness of the sample. The bevel angle is preferably comprised between 1 and 10°. Lower angles may promote the lack of edge fusion and higher angles would require more welding passes to fill the material. When the bevel has the shape of a double Y, the bevel angle refers to the angle of each Y.

Preferably, the beveled edge is milled so that the roughness Rz is higher than 4 μm, more preferably comprised between 4 and 16 μm. Such roughness improves the adhesion of the pre-coating on the beveled edge.

Preferably, the steel substrate is carbon steel.

The steel substrate can be optionally coated on at least part of one of its sides by an anti-corrosion coating. Preferably, the anti-corrosion coating comprises a metal selected from the group consisting of zinc, aluminium, copper, silicon, iron, magnesium, titanium, nickel, chromium, manganese and their alloys.

In a preferred embodiment, the anti-corrosion coating is an aluminium-based coating comprising less than 15 wt. % Si, less than 5.0 wt. % Fe, optionally 0.1 to 8.0 wt. % Mg and optionally 0.1 to 30.0 wt. % Zn, the remainder being Al and the unavoidable impurities resulting from the manufacturing process. In another preferred embodiment, the anti-corrosion coating is a zinc-based coating comprising wt. % Al, optionally 0.2-8.0 wt. % Mg, the remainder being Zn and the unavoidable impurities resulting from the manufacturing process.

The anti-corrosion coating is preferably applied on both sides of the steel substrate.

In term of process, once a steel substrate has been provided, a pre-coating solution is applied at least partially on the substrate beveled edge so as to form the pre-coating.

The pre-coating solution comprises a titanate and a nanoparticulate oxide, as described above for the pre-coating. In particular, it comprises from 100 to 500 g/L of titanate, more preferably between 175 and 250 $g \cdot L^{-1}$. In particular, it comprises from 1 to 200 $g \cdot L^{-1}$ of nanoparticulate oxide, more preferably between 5 and 80 $g \cdot L^{-1}$. Thanks to these concentrations in titanate and nanoparticulate oxide, the quality of the weld obtained with the help of the corresponding pre-coating is further improved.

Advantageously, the pre-coating solution further comprises a solvent. It allows for a well dispersed pre-coating. Preferably, the solvent is volatile at ambient temperature. For example, the solvent is chosen from among: water, volatile organic solvents such as acetone, methanol, isopropanol, ethanol, ethyl acetate, diethyl ether and non-volatile organic solvents such as ethylene glycol.

According to one variant of the invention, the pre-coating solution further comprises a binder precursor to embed the titanate and the nanoparticulate oxide and to improve the adhesion of the pre-coating on the steel substrate. Preferably, the binder precursor is a sol of at least one organofunctional silane. Examples of organofunctional silanes are silanes functionalized with groups notably of the families of amines, diamines, alkyls, amino-alkyls, aryls, epoxys, methacryls, fluoroalkyls, alkoxys, vinyls, mercaptos and aryls. Preferably, the binder precursor is added in an amount of 40 to 400 $g \cdot L^{-1}$ of the pre-coating solution.

The pre-coating solution can be obtained by first mixing titanate and nanoparticulate oxide. It can be done either in wet conditions with a solvent such as acetone or in dry conditions for example in a 3D powder shaker mixer. The mixing favors the aggregation of the nanoparticles on the titanate particles which prevents the unintentional release of nanoparticles in the air, which would be a health and safety issue.

The deposition of the pre-coating solution can be notably done by spin coating, spray coating, dip coating or brush coating.

Preferably, the pre-coating solution is deposited locally only. In particular, the pre-coating solution is applied in the area of the beveled edge where the steel substrate will be welded.

Once the pre-coating solution has been applied on the steel substrate, it can optionally be dried. The drying can be performed by blowing air or inert gases at ambient or hot temperature. When the pre-coating comprises a binder, the drying step is preferably also a curing step during which the binder is cured. The curing can be performed by Infra-Red (IR), Near Infra-Red (NIR), conventional oven.

Preferably, the drying step is not performed when the organic solvent is volatile at ambient temperature. In that case, the organic solvent evaporates leading to a dried pre-coating on the metallic substrate.

Once the pre-coating has been formed on a part of the beveled edge of the steel substrate, this part can be welded to another metallic substrate by laser arc hybrid welding.

The arc of the laser arc hybrid welding can be selected among submerged arc, gas metal arc, gas tungsten arc and plasma arc. All these arcs can benefit from the present invention.

The average electric current is preferably between 40 and 1000 A. The voltage is preferably between 1 and 40V.

The laser of the laser arc hybrid welding can be selected among solid state lasers, such as Nd:YAG, Nd:glass, Ruby, Nd:YLF, Yb:YAG, Yb:fibre, Ti:sapphire. Preferably, it is a Nd:YAG laser whose most common emission wavelength is 1064 nm or an Yb:YAG laser (at 1030 nm).

Any combination of arc and laser can benefit from the present invention since the pre-coating has similar effects on the different arcs and different lasers.

The welding is operated in leading arc configuration. This means that the arc is ahead of the laser beam. The arc hits first the steel substrate and melts it so as to form a molten pool. The laser then impacts the molten pool.

The other metallic substrate can be a steel substrate of the same composition or of a different composition than the pre-coated steel substrate. It can also be made of another metal, such as for example, aluminium. More preferably, the other metallic substrate is a pre-coated steel substrate according to the present invention. The other metallic substrate is positioned along the pre-coated beveled edge of the steel substrate. The two substrates are then welded by laser arc hybrid welding.

Depending on the welding technique, there can be a consumable electrode in the form of a wire (SAW, GMAW) or, if the electrode is not consumable, a material to fill the joint can be fed from the side in the form of a wire (GTAW, Plasma). In both cases, the wire is for example made of Fe, Si, C, Mn, Mo and/or Ni.

Depending on the welding technique, the beveled edge can be at least locally covered by a shielding flux. The shielding flux protects the welded zone from oxidation during welding.

With the method according to the present invention, it is possible to obtain a welded joint of at least a first metallic substrate in the form of a steel substrate and a second metallic substrate, the first and second metallic substrates being at least partially welded together by laser arc hybrid welding wherein the welded zone comprises a dissolved and/or precipitated pre-coating comprising a titanate and a nanoparticulate oxide.

The titanate is selected from the group of titanates consisting of alkali metal titanates, alkaline-earth titanates, transition metal titanates, metal titanates and mixtures thereof. The titanate is more preferably chosen from among: $Na_2Ti_3O_7$, $NaTiO_3$, $K_2TiO_3$, $K_2Ti_2O_5MgTiO_3$, $SrTiO_3$, $BaTiO_3$, $CaTiO_3$, $FeTiO_3$ and $ZnTiO_4$ and mixtures thereof.

The nanoparticulate oxide is chosen from $TiO_2$, $SiO_2$, $ZrO_2$, $Y_2O_3$, $Al_2O_3$, $MoO_3$, $CrO_3$, $CeO_2$, $La_2O_3$ and mixtures thereof.

By "dissolved and/or precipitated pre-coating", it is meant that components of the pre-coating can be dragged towards the center of the liquid-gas interface of the melt pool because of the reverse Marangoni flow and can be even dragged inside the molten metal. Some components dissolve in the melt pool which leads to an enrichment in the corresponding elements in the weld. Other components precipitate and are part of the complex oxides forming precipitates in the weld.

In particular, when the Al amount of the steel substrate is above 50 ppm, the welded zone comprises inclusions comprising notably Al—Ti oxides or Si—Al—Ti oxides or other oxides depending on the nature of the added nanoparticles. These precipitates of mixed elements are smaller than 5 μm. Consequently, they do not compromise the toughness of the welded zone. The inclusions can be observed by Electron Probe Micro-Analysis (EPMA). Without willing to be bound by any theory, it is believed that the nanoparticulate oxides promote the formation of inclusions of limited size so that the toughness of the welded zone is not compromised.

Finally, the invention relates to the use of a welded joint according to the present invention for the manufacture of components for oil&gas and offshore industries, shipbuilding, construction and transportation (rail and automotive).

EXAMPLES

The steel substrate having the chemical composition in weight percent disclosed in Table 1 was selected:

| C | Mn | Si | P | S | N | Al | Fe |
|---|---|---|---|---|---|---|---|
| 0.16-0.18 | 1.1-1.2 | 0.15-0.3 | 0.015 | 0.003 | 0.007 | 0.02-0.06 | Balance |

The steel substrate was 25 mm thick. It had a tensile strength of 485-620 MPa and a yield strength of 260 MPa.

Example 1

As illustrated on FIG. 1, samples 1 of 100×150 mm were prepared with beveled edges in double Y, each bevel being tilted at an angle $\alpha$ of 4° and the upper and lower bevel being separated by a gap 2 of 5 mm. The beveled edges were milled so that the bevel has a roughness Rz of 5-8 μm and the 5 mm gap has a roughness Rz of 6-15 μm. The beveled edge to be welded was cleaned from oil and dirt with acetone.

Sample 1 was not coated with a pre-coating.

For sample 2, an acetone solution comprising $MgTiO_3$ (diameter: 2 μm), $SiO_2$ (diameter: 10 nm) and $TiO_2$ (diameter: 50 nm) was prepared by mixing acetone with said elements. In the acetone solution, the concentration of $MgTiO_3$ was of 175 $g \cdot L^{-1}$. The concentration of $SiO_2$ was of 25 $g \cdot L^{-1}$. The concentration of $TiO_2$ was of 50 $g \cdot L^{-1}$. Then, the cleaned sidewall of sample 2 was coated with the acetone solution by spraying. The acetone evaporated. The percentage of $MgTiO_3$ in the dried pre-coating was of 70 wt. %, the percentage of $SiO_2$ was of 10 wt. % and the percentage of $TiO_2$ was of 20 wt. %. The pre-coating was 50 μm thick.

Samples 1 and 2 were each positioned side by side with a bare sample of the selected steel substrate spaced by a 0.3 mm gap and welded by laser arc hybrid welding in leading arc configuration without preheating by conducting weld passes until the bevel was filled and the joint was complete. The laser was a 16 kW Yb:YAG laser with a 0.3 mm spot. The arc equipment was a gas metal arc welding torch with an Argon/$CO_2$ 80/20 shielding gas. The feeding wire comprised maximum 0.06 wt % C, 0.8 wt % Si et 1.5 wt % Mn. The welding parameters are in the following Table 2:

| Sample | Welding pass | Laser power (kW) | Travel speed (mm/s) | Wire Feed Speed (m/min) | Distance laser substrate (mm) | Current (A) | Voltage (V) |
|---|---|---|---|---|---|---|---|
| 1 | 1st | 8.5 | 16 | 11.5 | 3 | 347 | 28.2 |
| | 2nd | 8 | 16 | 11 | | 344 | 27.9 |
| 2* | 1st | 8.5 | 16 | 11.5 | 3 | 325 | 28.6 |

*according to the invention

As it is apparent from Table 2, Sample 1 needed two welding passes to be fully welded while Sample 2 needed only one welding pass with the same welding parameters. This first result already shows that the pre-coating according to the invention increases the penetration depth and productivity of the laser arc hybrid welding in leading arc configuration.

After welding, the weld of both welded assemblies was inspected visually and by X-ray imaging and a cross-section was analyzed micrographically.

Table 3 below details the micrographic analysis of each weld:

| | Penetration depth of first welding pass(mm) | |
|---|---|---|
| sample | Arc | Laser |
| 1 | 4.9 | 11.4 |
| 2* | 5.4 | 17.2 |

*according to the invention

The pre-coating improved the arc penetration by 10% and the laser penetration by 50%.

The X-ray imaging analysis revealed cracks along the weldment of Sample 1 and the cross-section analysis revealed cracks in Sample 1. These results show that the pre-coating improves the wettability.

Tensile tests, Charpy-V tests and hardness characterization also confirmed that the pre-coating on the beveled edge of the steel substrate improves the laser arc hybrid welding in leading arc configuration without degrading the mechanical properties of the joint.

Example 2

Sample 3 was prepared as Sample 2 (with pre-coating).

It was then welded with an increased travel speed (25 mm/s, i.e. an increase of 56%) and a reduced gap (0.2 mm), with and without preheating the samples at 320° C. before welding, all other conditions being the same as in Example 1.

The results obtained confirmed that, thanks to the pre-coating, it is possible to increase the travel speed and thus the productivity of the laser arc hybrid welding. Moreover, this productivity improvements comes without degradation of the mechanical properties of the joint and even with improvement of some mechanical properties of the joint as shown in Table 4, where the results obtained with pre-heated Sample 3 are compared to the ones obtained with pre-heated Sample 1 (detailed in Example 1):

| Sample | Tensile test (UTS in MPa) | Charpy-V impact test (J) | Fracture in base material | Hardness |
|---|---|---|---|---|
| 1 | 530 | 152 | OK | OK |
| 3* | 540 | 367 | OK | OK |

*according to the invention

Charpy V-test was done according to ISO 9016:2012 at T=−20° C.

"OK" in column "Fracture in base material" means that the fracture of the sample at the end of the tensile test was on the base metal, which is sought for welded samples.

"OK" in column "hardness" means that the hardness of the tested sample complies with the ISO 15614-1:2017 standard.

Example 3

The effect of different pre-coatings on the welding of steel substrates was assessed by Finite Element Method (FEM) simulations. In the simulations, the pre-coatings comprise nanoparticulate oxides having a diameter of 10-50 nm and optionally $MgTiO_3$ (diameter: 2 μm). The thickness of the coating was of 40 μm. Arc welding was simulated with each pre-coating and the results are in the following Table 5:

| Sample | Coating composition (wt. %) titanate | | | | Results |
|---|---|---|---|---|---|
| | | Nanoparticulate oxides | | | |
| 4* | 50% $MgTiO_3$ | 40% $TiO_2$ | 10% YSZ | — | Homogeneous thermal profile. No formation of brittle phases. Maximum temperature in the middle of the steel. Full penetration |
| 5* | 50% $MgTiO_3$ | 15% $TiO_2$ | 35% $Al_2O_3$ | — | Homogeneous thermal profile. No formation of brittle phases. Maximum temperature in the middle of the steel. Full penetration |
| 6* | 50% $MgTiO_3$ | 15% $TiO_2$ | 35% $MoO_3$ | — | Homogeneous thermal profile. No formation of brittle phases. Maximum temperature in the middle of the steel. Full penetration |
| 7* | 50% $MgTiO_3$ | 15% $TiO_2$ | 35% $CrO_3$ | — | Homogeneous thermal profile. No formation of brittle phases. Maximum temperature in the middle of the steel. Full penetration |
| 8 | 50% $MgTiO_3$ | 15% $TiO_2$ | 35% CaO | — | High refractory effect of CaO. Arc heat in the surface of the plate. No full penetration |
| 9 | 50% $MgTiO_3$ | 15% $TiO_2$ | 35% MgO | — | High refractory effect of MgO. Arc heat in the surface of the plate. No full penetration |
| 10* | 50% $MgTiO_3$ | 15% $TiO_2$ | 35% $CeO_2$ | — | Homogeneous thermal profile. No formation of brittle phases. Maximum temperature in the middle of the |

-continued

| Sample | Coating composition (wt. %) titanate | Nanoparticulate oxides | | | Results |
|---|---|---|---|---|---|
| | | | | | steel. Full penetration |
| 11 | 50% $MgTiO_3$ | 15% $TiO_2$ | 35% $B_2O_3$ | — | Maximum arc heat in the surface of the steel. No full penetration. Formation of brittle phases |
| 12* | 70% $MgTiO_3$ | 10% $SiO_2$ | 20% $CeO_2$ | — | Homogeneous thermal profile. No formation of brittle phases. Maximum temperature in the middle of the steel. Full penetration |
| 13 | 70% $MgTiO_3$ | 30% $Cr_2O_3$ | | — | Maximum arc heat in the surface of the steel. No full penetration. Formation of brittle phases |
| 14 | 0 | 20% MgO | 70% $Co_3O_4$ | 10% $SiO_2$ | High refractory effect of MgO and $Co_3O_4$. Arc heat in the surface of the plate. No full penetration |
| 15 | 0 | 20% $MoO_3$ | 70% $CeO_2$ | 10% $SiO_2$ | No effect of the flux. No full penetration |
| 16 | 70% $MgTiO_3$ | 30% TiN | | — | No effect of the flux. No full penetration |

*according to the present invention

Results show that the pre-coatings according to the present invention improve the penetration and the quality of the welds compared to comparative examples.

Example 4

For sample 17, a water solution comprising the following components was prepared: 363 $g \cdot L^{-1}$ of $MgTiO_3$ (diameter: 2 μm), 77.8 $g \cdot L^{-1}$ of $SiO_2$ (diameter range: 12-23 nm), 77.8 $g \cdot L^{-1}$ of $TiO_2$ (diameter range: 36-55 nm) and 238 $g \cdot L^{-1}$ of 3-aminopropyltriethoxysilane (Dynasylan® AMEO produced by Evonik®). The solution was applied on the beveled edge of the steel substrate and dried by 1) IR and 2) NIR. The dried pre-coating was 40 μm thick and contained 62 wt % of $MgTiO_3$, 13 wt % of $SiO_2$, 13 wt % of $TiO_2$ and 12 wt % of the binder obtained from 3-aminopropyltriethoxysilane.

For sample 18, a water solution comprising the following components was prepared: 330 $g \cdot L^{-1}$ of $MgTiO_3$ (diameter: 2 μm), 70.8 $g \cdot L^{-1}$ of $SiO_2$ (diameter range: 12-23 nm), 70.8 $g \cdot L^{-1}$ of $TiO_2$ (diameter range: 36-55 nm), 216 $g \cdot L^{-1}$ of 3-aminopropyltriethoxysilane (Dynasylan® AMEO produced by Evonik®) and 104.5 $g \cdot L^{-1}$ of a composition of organofunctional silanes and functionalized nanoscale $SiO_2$ particles (Dynasylan® Sivo 110 produced by Evonik). The solution was applied on the beveled edge of the steel substrate and dried by 1) IR and 2) NIR. The dried pre-coating was 40 μm thick and contained 59.5 wt % of $MgTiO_3$, 13.46 wt % of $SiO_2$, 12.8 wt % of $TiO_2$ and 14.24 wt % of the binder obtained from 3-aminopropyltriethoxysilane and the organofunctional silanes.

In all cases, the adhesion of the pre-coating on the beveled edge was greatly improved.

The beneficial effects of the invention have been illustrated in the case of the laser arc hybrid welding in leading arc configuration with a MAG arc and a Yb:YAG laser. They are nevertheless extendable to other arcs and lasers since all these techniques use beveled edges coatable with the pre-coating so that the arc and melt pool physics are modified.

The invention claimed is:

1. A method for the manufacture of a welded joint comprising the following successive steps:

providing at least two metallic substrates wherein a first of the least two metallic substrates is a steel substrate having a thickness of at least 8 mm and being delimited by at least one beveled edge, the beveled edge being at least partially coated with a pre-coating including a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof, wherein a thickness of the pre-coating is between 10 to 140 μm; and welding the at least two metallic substrates along the at least partially coated beveled edge by laser arc hybrid welding in leading arc configuration.

2. The method as recited in claim 1 wherein the titanate is chosen from the group consisting of: $Na_2Ti_3O_7$, $NaTiO_3$, $K_2TiO_3$, $K_2Ti_2O_5$, $MgTiO_3$, $SrTiO_3$, $BaTiO_3$, $CaTiO_3$, $FeTiO_3$ and $ZnTiO_4$ and mixtures thereof.

3. The method as recited in claim 1 wherein a percentage of the nanoparticulate oxide in the pre-coating is below or equal to 80 wt. %.

4. The method as recited in claim 1 wherein a percentage of the nanoparticulate oxide in the pre-coating is above or equal to 10 wt. %.

5. The method as recited in claim 1 wherein the nanoparticles have a size between 5 and 60 nm.

6. The method as recited in claim 1 wherein a percentage of titanate in the pre-coating is above or equal to 45 wt. %.

7. The method as recited in claim 1 wherein a diameter of the titanate is between 1 and 40 μm.

8. The method as recited in claim 1 wherein the pre-coating further includes a binder.

9. The method as recited in claim 8 wherein a percentage of binder in the pre-coating is between 1 and 20 wt. %.

10. The method as recited in claim 1 wherein the arc of the laser arc hybrid welding is selected among submerged arc, gas metal arc, gas tungsten arc and plasma arc.

11. A method for the manufacture of a pre-coated steel substrate comprising the successive following steps:

providing a steel substrate having a thickness of at least 8 mm and being delimited by at least one beveled edge with a bevel angle between 1 and 10°; and depositing, at least partially on the beveled edge, a pre-coating solution including a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof, wherein the pre-coating solution includes from 100 to 500 g/L of titanate.

12. The method as recited in claim 11 wherein the depositing of the pre-coating solution is performed by spin coating, spray coating, dip coating or brush coating.

13. The method as recited in claim 11 wherein the pre-coating solution further includes a solvent.

14. The method as recited in claim 11 wherein the pre-coating solution includes from 1 to 200 g/L of nanoparticulate oxide.

15. The method as recited in claim 11 wherein the pre-coating solution further includes a binder precursor.

16. The method as recited in claim 11 further comprising drying the pre-coated steel substrate obtained by the depositing step.

17. A coated steel substrate comprising: a steel substrate having a thickness of at least 8 mm and being delimited by at least one beveled edge with a bevel angle between 1 and 10°, the beveled edge being at least partially coated with a pre-coating comprising a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof, wherein a thickness of the pre-coating is between 10 to 140 μm.

18. A method for the manufacture of a welded joint comprising the following successive steps:

providing at least two metallic substrates wherein a first of the least two metallic substrates is a steel substrate having a thickness of at least 8 mm and being delimited by at least one beveled edge, the beveled edge being at least partially coated with a pre-coating including a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof, wherein a diameter of the titanate is between 1 and 40 μm; and welding the at least two metallic substrates along the at least partially coated beveled edge by laser arc hybrid welding in leading arc configuration.

19. A method for the manufacture of a welded joint comprising the following successive steps:

providing at least two metallic substrates wherein a first of the least two metallic substrates is a steel substrate having a thickness of at least 8 mm and being delimited by at least one beveled edge, the beveled edge being at least partially coated with a pre-coating including a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof, wherein the pre-coating further includes a binder, and a percentage of binder in the pre-coating is between 1 and 20 wt. %; and welding the at least two metallic substrates along the at least partially coated beveled edge by laser arc hybrid welding in leading arc configuration.

* * * * *